(12) United States Patent
Gaiotto et al.

(10) Patent No.: US 7,106,197 B2
(45) Date of Patent: Sep. 12, 2006

(54) APPARATUS FOR MONITORING PERSONS WITHIN PREDETERMINED AREAS, IN PARTICULAR THE PASSENGERS OF AN AIRCRAFT

(75) Inventors: Maurizio Gaiotto, Via Ossario, 8/A, I-31040, Nerveza Della Battaglia (IT); Giovanni Pradella, Via San Gallet, 11, I-31053, Pieve di Soligo (IT)

(73) Assignees: Maurizio Gaiotto, Battaglia (IT); Giovanni Pradella, Pieve Di Soligo (IT); Giovanni Benetton, Paese (IT); Claudio Vanin, Lancenigo Di Villorba (IT)

( * ) Notice: Subject to any disclaimer, the term of this patent is extended or adjusted under 35 U.S.C. 154(b) by 187 days.

(21) Appl. No.: 10/506,250

(22) PCT Filed: Jan. 9, 2003

(86) PCT No.: PCT/EP03/00142
§ 371 (c)(1),
(2), (4) Date: Sep. 10, 2004

(87) PCT Pub. No.: WO03/077217
PCT Pub. Date: Sep. 18, 2003

(65) Prior Publication Data
US 2005/0146434 A1  Jul. 7, 2005

(30) Foreign Application Priority Data
Mar. 11, 2002  (IT) .......................... VE2002A0011

(51) Int. Cl.
*G08B 13/14* (2006.01)
(52) U.S. Cl. .............................. 340/572.1; 340/573.1; 340/573.4; 340/574; 340/539.11; 340/539.13; 340/539.12
(58) Field of Classification Search ........... 340/539.11, 340/539.12, 539.13, 572.1, 573.1, 574, 573.4
See application file for complete search history.

(56) References Cited

U.S. PATENT DOCUMENTS

| 5,075,670 A | 12/1991 | Bower et al. |
| 5,627,520 A * | 5/1997 | Grubbs et al. ........... 340/572.1 |
| 5,650,766 A | 7/1997 | Burgmann |
| 6,335,688 B1 | 1/2002 | Sweatte |
| 2003/0174059 A1 * | 9/2003 | Reeves .................... 340/573.4 |

FOREIGN PATENT DOCUMENTS

| DE | 197 32 806 | 2/1999 |
| FR | 2641397 | 6/1990 |

* cited by examiner

*Primary Examiner*—Jeffery Hofsass
*Assistant Examiner*—Edny Labbees
(74) *Attorney, Agent, or Firm*—Hoffman,Wasson & Gitler PC

(57) ABSTRACT

An apparatus for monitoring persons within predetermined areas has a plurality of tags irremovably applicable to persons and contain data characteristic of the person. At least one sensor for senses the presence of each person and is operationally connectable to each tag (2) via an ether. A supervision and control unit is operationally connected to the at least one sensor.

16 Claims, 7 Drawing Sheets

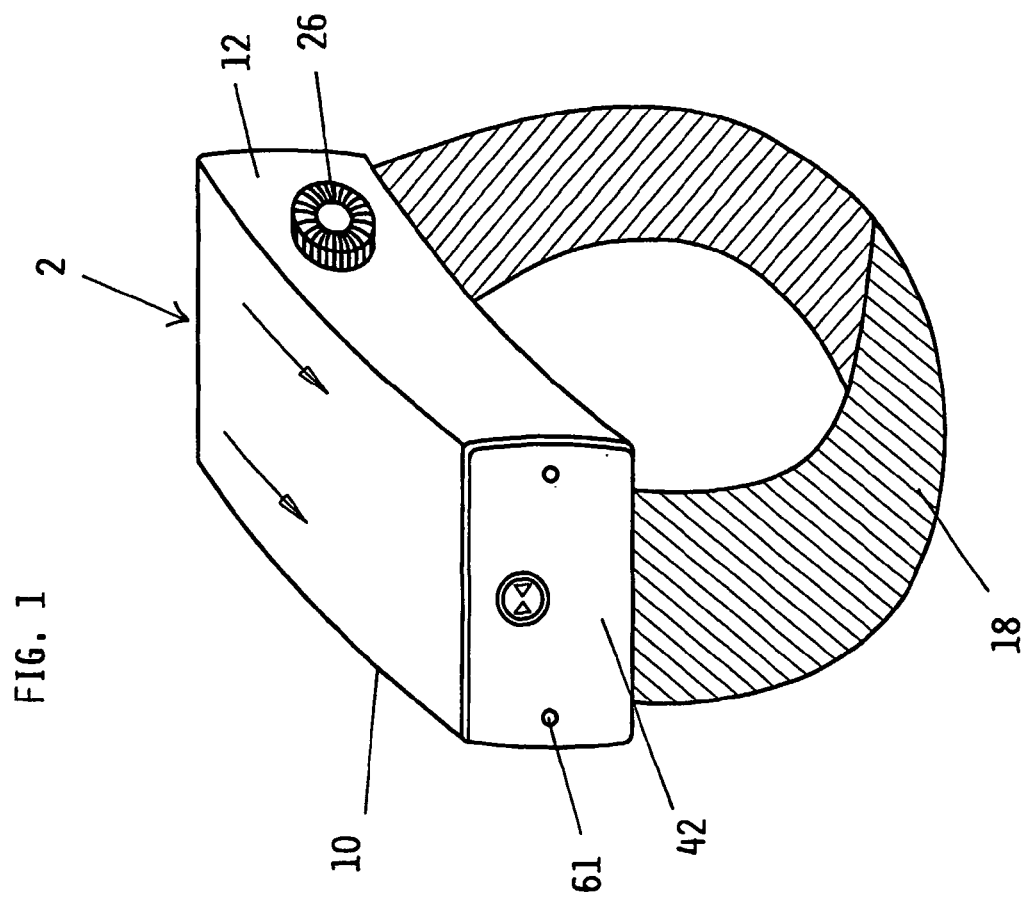
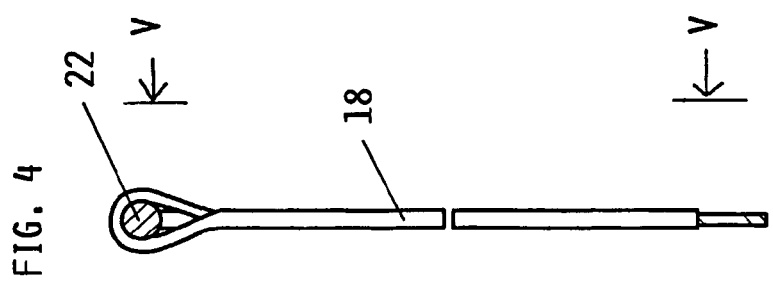
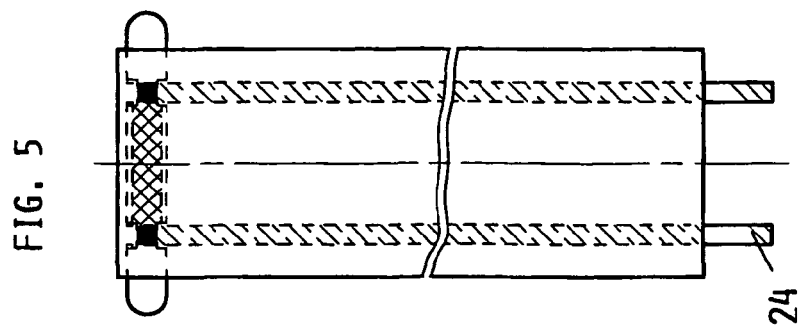

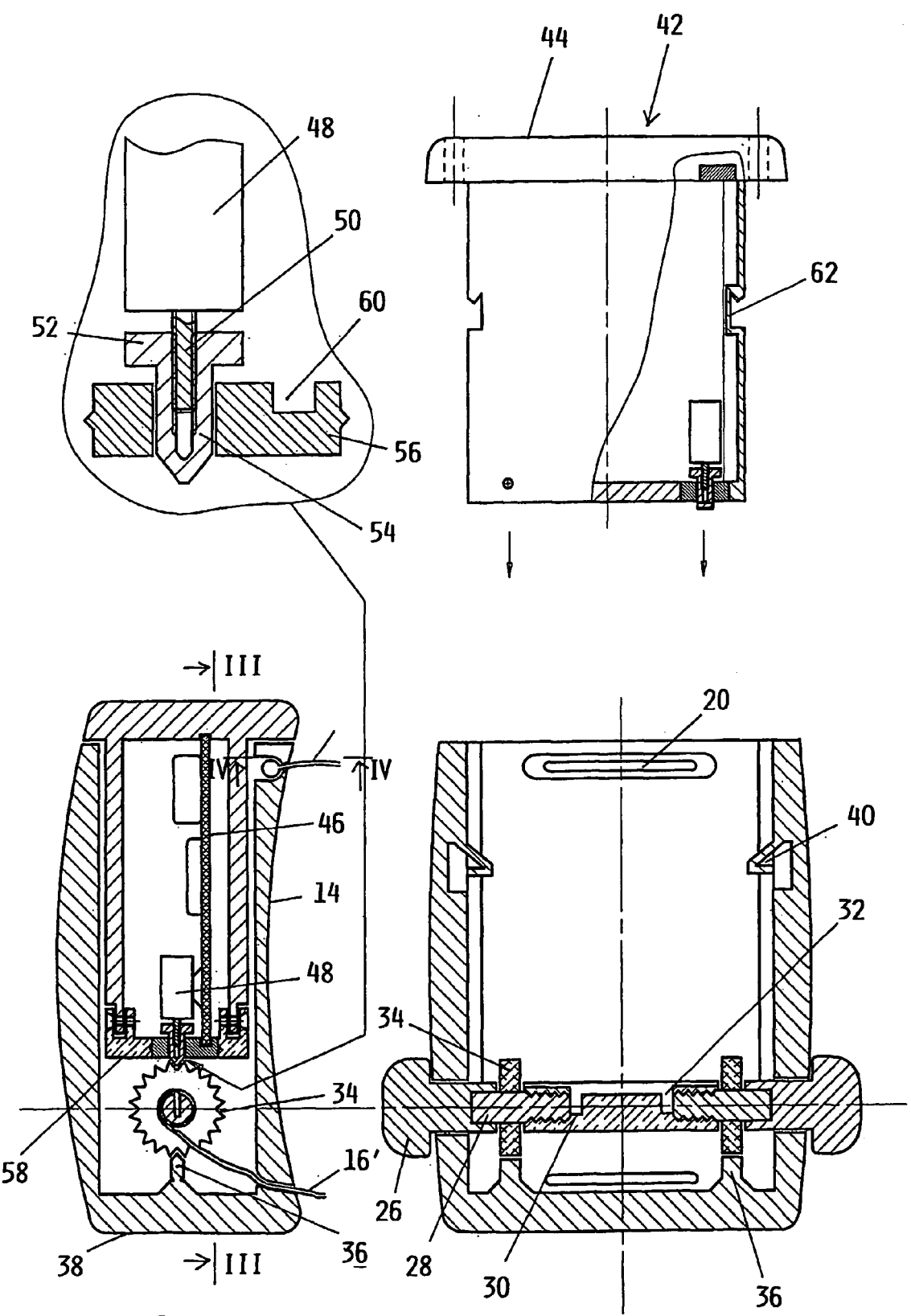

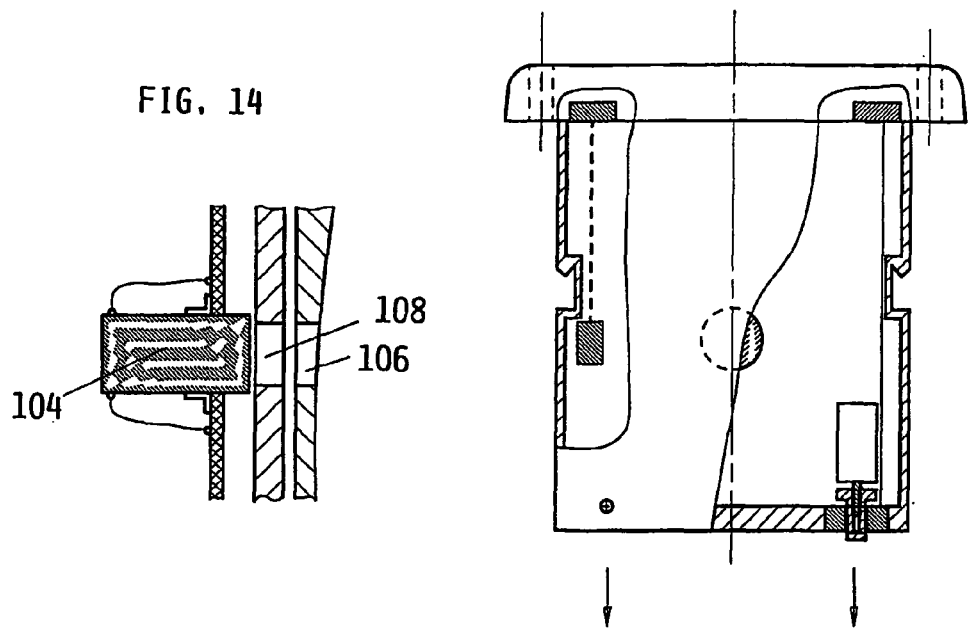
FIG. 14
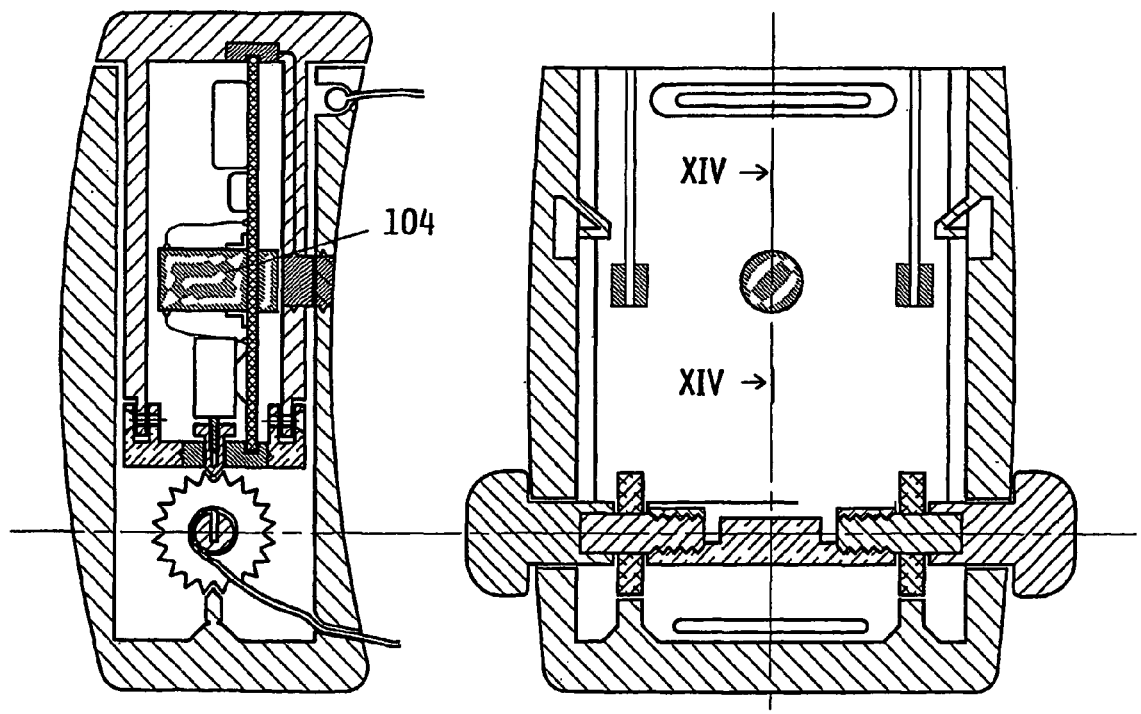
FIG. 12
FIG. 13

APPARATUS FOR MONITORING PERSONS WITHIN PREDETERMINED AREAS, IN PARTICULAR THE PASSENGERS OF AN AIRCRAFT

This invention relates to an apparatus for monitoring persons within predetermined areas, in particular for monitoring the position of passengers on board an aircraft.

Safety on board aircraft has for many years constituted a problem to which the aeronautical authorities have dedicated particular attention, especially since criminal activity has shown the extreme ease with which an ill-intentioned person can take possession of an aircraft in flight and determine the behaviour of the crew by armed threats. Following the continued increase in air traffic, this problem has become increasingly more felt and the ground control measures before boarding have not always proved sufficient, particularly in consideration of the fact that even utensils of common use, such as knives, scissors, screwdrivers etc., can in the hands of an ill-intentioned person be used as a weapon able to intimidate those against whom he wishes to act.

However, as it is not possible to compel passengers on board an aircraft to remain seated in their assigned position for the entire flight, especially if a long haul flight, the need arises to automatically monitor the position of all passengers in order to receive a timely indication of an abnormal situation and to take all those measures necessary to prevent or at least reduce the consequences of a possible criminal act.

U.S. Pat. No. 5,075,670 discloses a signalling tag of the type used in house arrest systems which has a tamper detection device for detecting removal of the tag from the monitored person. The signal is set to a tamper condition upon removal. The tamper detector can only by reset to the normal state by a reset signal which incorporates a characteristic of the signal sent by the tag.

U.S. Pat. No. 5,650,766 discloses a wearable transmitter assembly including a housing containing a radio frequency transmitter and tamper detecting circuit that are attached to an appendage of an individual with a buckle and strap. A light emitter and a light sensor are disposed in the housing and extend to the outside of the housing through one or more apertures.

The main object of the invention is to monitor a person's presence/continuance within predetermined areas for a certain time period.

Another object of the invention is to provide an apparatus able to monitor from a predetermined station, preferably located within the flight deck, the position of all passengers on board an aircraft, while at the same time enabling the passengers to move about in permitted spaces, within the limits in which such movements do not result in dangerous situations.

Another object of the invention is to effect this monitoring in such a manner as to exactly identify a passenger or passengers behaving suspiciously.

Another object of the invention is to intervene in good time, possibly automatically, such as to indicate dangerous situations and to prevent such situations resulting in loss of aircraft control by the crew.

All these and further objects which will be apparent from the ensuing description are attained, according to the invention, by a person monitoring apparatus as described in claim 1.

A preferred embodiment of the invention is described in detail hereinafter with reference to the accompanying drawings, in which:

FIG. 1 is a perspective view of a tag to be applied to each person;

FIG. 2 is an enlarged longitudinal section therethrough;

FIG. 3 is an exploded longitudinal section therethrough on the line III—III of FIG. 2;

FIG. 4 is an enlarged partial section therethrough on the line IV—IV of FIG. 2;

FIG. 5 is a view thereof in the direction V—V of FIG. 4;

FIG. 12 shows a further variant thereof;

FIG. 13 is an exploded longitudinal section therethrough;

FIG. 14 is a section therethrough on the line XIV—XIV of FIG. 13;

Figure 6:
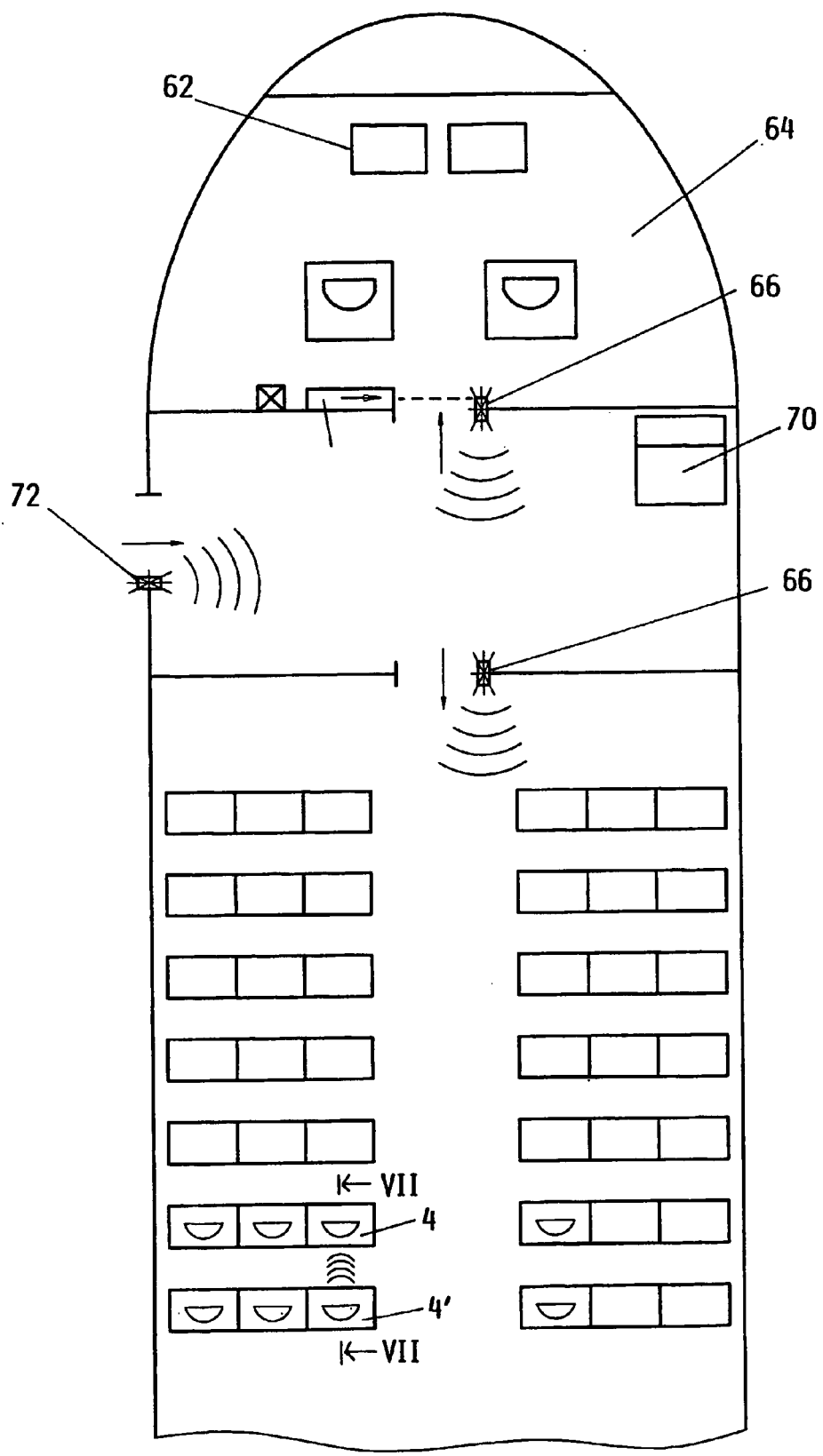
FIG. 6 is a plan view of the front part of an aircraft in which the apparatus of the invention is installed.
Figure 7:
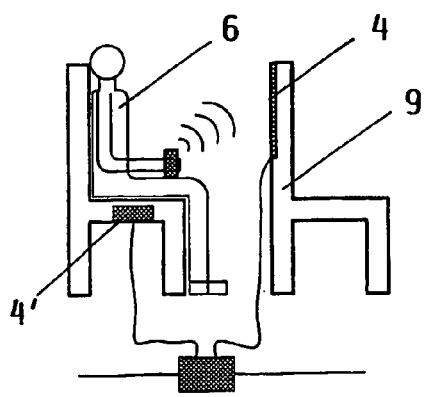
FIG. 7 is an enlarged vertical section therethrough on the line VII—VII of FIG. 6.

As can be seen from the figures, the apparatus of the invention comprises the following essential components:
- a plurality of tags 2, each of which contains the data characteristic of the person 6 wearing it,
- a plurality of sensors 4 for sensing the tag 2 applied to the person,
- a supervision and control unit 8 operationally connected to all the sensors 4.

Each tag 2 comprises a small plastic box 10 of substantially parallelepiped shape from which one of the minor walls is lacking, and in which the two side walls 12 are flat and the two major walls 14 are slightly arched to better adhere to the wrist of the person 6. That major wall 14 which is to adhere to the person's wrist presents two slots 16, 16' through which a strap 18 can be passed to secure it to said wrist.

In proximity to the slot 16 there are provided two small cylindrical seats 20 for housing the two ends of a metal pin 22, about which one end of the strap 18 is wrapped and hot-bonded. This is formed of synthetic material and carries embedded in its interior two metal conductors 24 which at one end are wound about and brazed to the pin 22 and at their other end emerge from the end of the strap 18.

In proximity to the other slot 16', provided in the major wall 14 of the box 10, there are provided in the two side walls 12 of the box two small holes for the passage of two small knurled winding knobs 26 for the strap 18. More specifically, the two knobs 26 engage with rotational constraint two threaded metal pins 28, which can be screwed axially into a winding roller 30 of insulating material for the strap 18. The connection between the two is obtained by providing the roller 30 with two holes 32 into which the two terminations of the two metal conductors 24 embedded in the strap 18 are inserted, to be then locked in their seat by fully screwing the two pins 28 into the roller 30. This screwing also securely fixes to the roller 30 two small toothed wheels 34 previously inserted between it and the two threaded pins 28.

A pair of elastic fins 36, formed on the inner side of the front wall 38 of the box 10, opposes the free rotation of the assembly formed by the two knurled knobs 26, the two threaded pins 28, the winding roller 30 and the two toothed wheels 34.

From the two side walls 12 of the parallelepiped box 10 there also project towards the interior of the box two further elastic fins 40, the purpose of which will be apparent hereinafter.

Each tag 2 according to the invention also comprises a removable portion or button indicated overall by the number 42 and engagable with said box 10 by insertion through its front aperture.

Each button 42 is of essentially parallelepiped shape and of such dimensions as to enable this insertion, but presents a front wall 44 of larger dimensions to abuttingly adhere to the edges of the front aperture of said seat 10.

The button 42 contains in its interior an electronic card 46 on which a microprocessor with memory, a receiver, a transmitter, a battery and all the electronic components necessary for its correct operation are mounted. On the card 46 there are mounted two motors 48 with a threaded shaft engagable in a square peg 52, which is electrically isolated from the shaft and is guided along a corresponding hole 54 provided in a metal seat 56 formed on the base 58 of the button, on which there are also provided two seats 60 for housing the card 46.

In two opposing walls of the button 42 there are also provided two notches 62 in which the two elastic fins provided on the two side walls 12 of the box 10 can be irreversibly snap-engaged when the button 42 is completely inserted into said box.

The operation of the device of the invention will now be described with reference to passengers of an aircraft, with the aim of controlling safety on board the aircraft during flight.

The tag 2 is applied to the wrist of the passenger 6 with the strap 18 completely slackened; the passenger himself or the responsible attendant then winds the strap 18 about the roller 30 by operating the two knurled knobs 26. When the strap has been adequately tightened on the wrist of the passenger 6, the button 42, previously personalized with the characteristic data of the passenger, is inserted into the box 10. This insertion is complete when the two elastic fins 40 have engaged the two notches 62 and when the pegs 52 have engaged the toothed wheels 34. When in this state, which is made stable by the irremovable engagement of the button 42 in the box 10, the strap becomes locked in its previously attained configuration, and can no longer be unwound to enable the tag 2 to be removed from the passenger's wrist.

The tag can also not be removed from the passenger's wrist by tearing or cutting the strap 18, because this would interrupt the electrical continuity provided by the two conductors 24 embedded in the strap, and by the pin 22, this electrical continuity being transmitted to the interior of the electronic card 46 by the engagement between the toothed wheels 34 and the two conductors 24 via the two pins 28, the pegs 54 engaged with the toothed wheels 34, and the metal seats 56 in contact with the electronic card 46.

In addition to these components, all of which are essential for attaining the primary object of the present invention, there are also provided a plurality of components described in detail hereinafter, their purpose being to solve particular problems which can arise as a result of monitoring the passengers on board an aircraft.

Another essential element of the apparatus of the invention is the group of sensors for sensing the presence of each passenger. Specifically, there are two types of sensor, both applied in correspondence with each seat 9. A first sensor 4 consists of an antenna which is applied to the back-rest of the seat lying in front of the seat 9 concerned, and is able to dialog, via the ether, with the tag 2 applied to the passenger 6 seated on said seat and, via wire, with the supervision and control unit. The other sensor 4' consists of a presence sensor, which is applied to the seat 9 concerned and is able to sense the presence of a passenger seated on the seat. This is also connected, via wire, to the supervision and control unit. Both the sensors 4, 4' could however dialog with the supervision and control unit via ether instead of via wire.

The purpose of the supervision and control unit is to control and coordinate the complex of information arriving from the tags 2 positioned on the wrist of all the aircraft passengers 6. To this end, it is provided with a microprocessor with memory, a series of circuits able to sense and memorize the conditions of the various person presence sensors 4, 4' moment by moment, and a series of circuits for controlling peripheral units, which can be used for the best possible control of the aircraft.

One type of peripheral unit is a monitor 62. One or more monitors can be installed on the aircraft, depending on requirements and on the stations from which the state of the aircraft must be monitored. One of these monitors is conveniently installed on the flight deck 64, other monitors being possibly installed in those positions reserved for flight attendants.

Each monitor can display, in the form of a table or preferably in the form of a plan of the aircraft, all the seats reserved for passengers and whether they are unoccupied or occupied. The unoccupied condition is preferably indicated in different ways, depending on whether that seat has not actually been assigned to a passenger or whether it has been assigned to a passenger who at that moment does not occupy it. Likewise, the occupied condition is preferably indicated in different ways, depending on whether that seat has actually been assigned to a passenger or whether it is temporarily occupied by a passenger to whom a different seat has been assigned.

Another type of peripheral unit is a sensor 66 for sensing the presence or passage of a passenger within or into a determined area subjected to control. This area can consist of an area to which the passenger has access, for example an aisle or the area in front of a toilet; or an area in which passengers are prohibited, for example an area reserved to the flight attendants or the area in front of the access door 68 to the crew cabin 64.

Another type of peripheral unit is a device able to lock the access door in an area prohibited to passengers, and to close said door.

Another type of peripheral unit is an alarm indicator; it can be of optical type (flashing) or acoustic (siren) or optical and acoustic simultaneously, and can be installed in all those positions in which it is advisable to provide an alarm warning, for example on the flight deck, in areas reserved to flight attendants, in the passenger cabin, etc.

Another type of peripheral unit is a transmitter or receiver, able to automatically make a connection to ground control in order to transmit any abnormality encountered on the aircraft during flight.

Another type of peripheral unit is an encoder 70, able to record in the memory of the tag 2 the characteristic data of the passenger wearing that tag.

Another type of peripheral unit is a complex of video cameras for installation in the passenger cabin and cyclically operable to display on the monitor 62 the general situation within the aircraft.

The overall operation of these elements is such that passenger monitoring commences within the airport itself, namely at the check-in. Here, each passenger is handed not only the boarding card carrying the magnetic strip on which the passenger identification data (name, flight, destination, seat assigned, etc.) is recorded, but also the tag 2 without the button 46.

When the passenger boards the aircraft, the flight attendants use the encoder 70 to record on a neutral button the data read from the boarding card to perfectly identify each passenger and the seat assigned. The thus personalized button 46 is then applied to the tag 2, already fixed to the wrist of the corresponding passenger 6, to lock it securely and irreversibly to the wrist.

As each passenger 6 occupies the assigned seat, the two sensors 4 and 4' sense this fact and transmit it to the supervision and control unit 8, which is able to display on the monitor 62 the correct occupation of the seats on the aircraft.

At the same time the video cameras installed within the aircraft cyclically display on the monitor 62 (or possibly on another monitor to the side thereof) the images received, to hence display the situation on board in clear form and in real time.

If a passenger 6 leaves his seat to occupy a different seat, this fact is also sensed, displayed on the monitor 62 and memorized in said control unit 8 to enable complete person monitoring during the entire flight.

If a passenger 8 should transit through prohibited passageways or should too closely approach prohibited areas, the corresponding sensors 66 are activated to not only indicate the fact on the monitor 62 but to also emit an acoustic and/or optical alarm signal. If these controlled areas are absolutely prohibited to passengers (for example the flight deck 64), the corresponding sensors 66 not only emit the alarm signal but also cause automatic fastening of the door 68 giving access to the protected area.

The apparatus of the invention is also able to distinguish between the different alarm signals, in the sense of recognizing whether the alarm situation is temporary, i.e. ceases immediately after the signal (for example because the passenger has withdrawn from the controlled area), or remains beyond a predetermined time period; in this case in addition to the optical and/or acoustic warning, the alarm signal can also be transmitted to ground control.

At the end of the flight, i.e. when the aircraft has stopped and the passengers are required to leave, the central control system activates the motors 48 in the sense of disengaging the pegs 52 from the toothed wheels 34 so that the strap 18 can be slackened by a simple pull, allowing the arm to be removed from the tag so that this remains on board the aircraft, to enable the appropriate attendants to newly encode the button at the required time.

Figure 16:
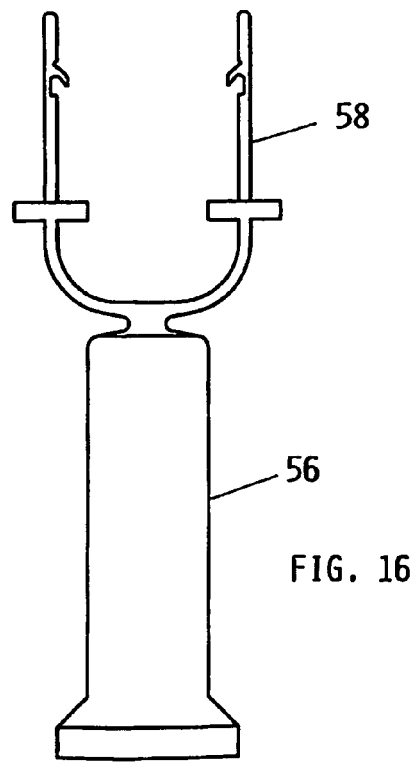
FIG. 16 shows an implement for removing the tag.

In the case of a fault in the automatic release process, the tag 2 can be removed from the wrist of the passenger 6 by a special tool 56 (see FIG. 16) in the possession of the appropriate attendants, and consisting of a type of fork, the arms 58 of which can be inserted, by way of two holes 61 provided in the front wall of the button 42, into the interspace between said button and said box 10, until the two elastic fins 40 are reached, after which these can be deviated outwards to disengage them from the respective notches 62.

To prevent a passenger leaving with the tag in his possession due to forgetfulness of the flight attendants, a sensor 72 is provided on the aircraft door.

The aforegoing description has referred to the monitoring of persons in an aircraft, however the apparatus can also be used to monitor the position of passengers in a coach, in a train etc., or in any other place in which the presence/ continuance of persons in areas for a certain time period has to be monitored, for example in a theatre, museum, hospital, etc.

In a modified embodiment (not shown in the drawings), instead of providing the movable peg 52 driven by the motor 48, the bottom surface of the button is provided with a rack cooperating with the toothed wheel.

When the tag is in place, the knurled knob is used to wind the strap until it is tight about the passenger's arm.

The button is then inserted, its rack then preventing rotation of the toothed wheel and slackening of the strap.

Figure 8:
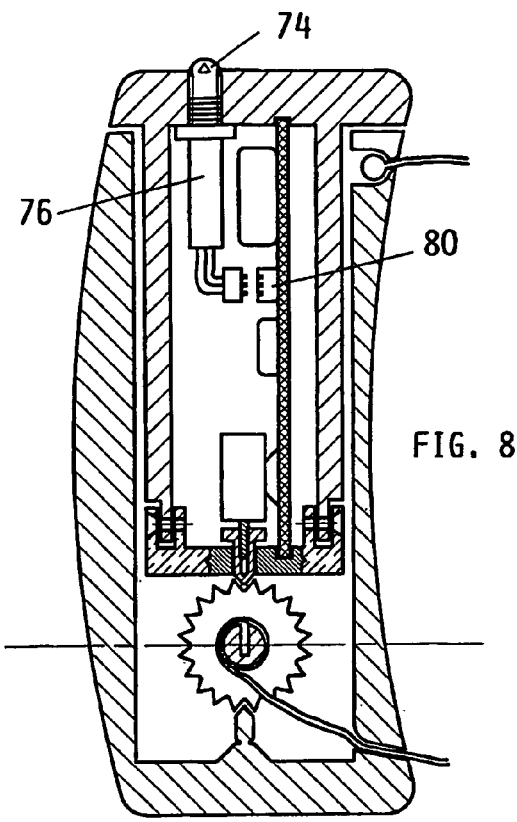
FIG. 8 shows a first variant of the tag.
Figure 9:
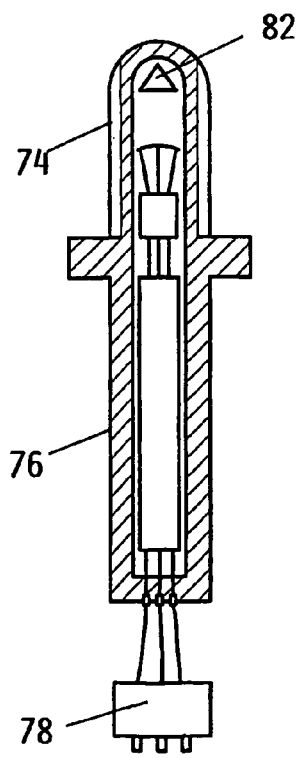
FIG. 9 is a section therethrough taken in correspondence with the sensor.

In the embodiment shown in FIG. 8, into the portion 42 of the button there is screwed the head 74 of a sensor 76 provided with a plug 78 connectable to a socket 80 applied to the card 46.

The sensor 76, for example for sensing explosives or drugs, is provided with two small apertures 82 enabling it to interact with the environment for their detection.

The sensor is powered by the card and its data in serial form to the microprocessor provided on the card.

Figure 10:
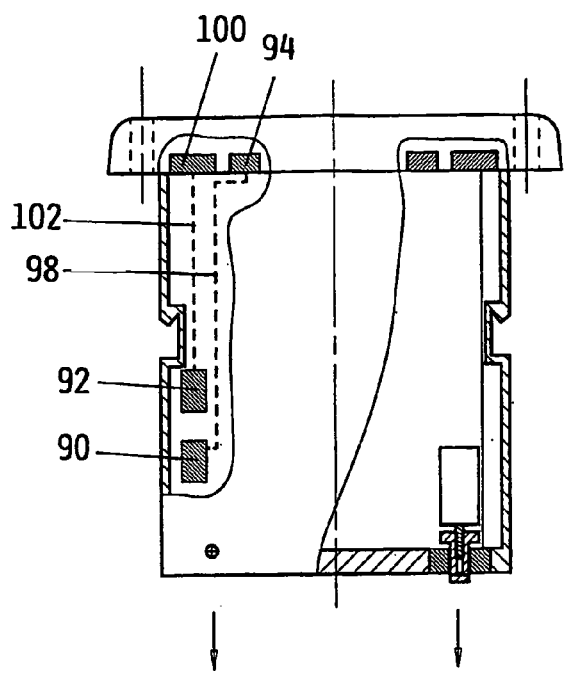
FIG. 10 shows a second variant thereof.
Figure 11:
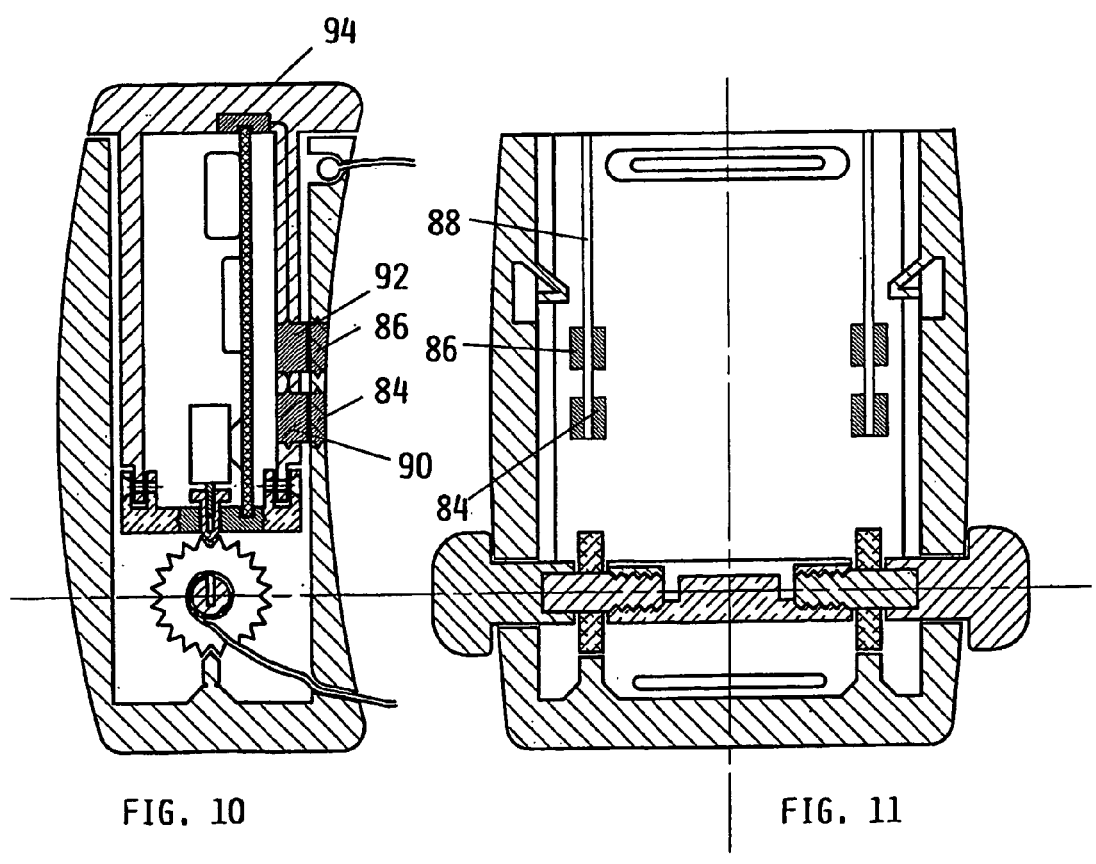
FIG. 11 is an exploded longitudinal section therethrough.
Figure 15:
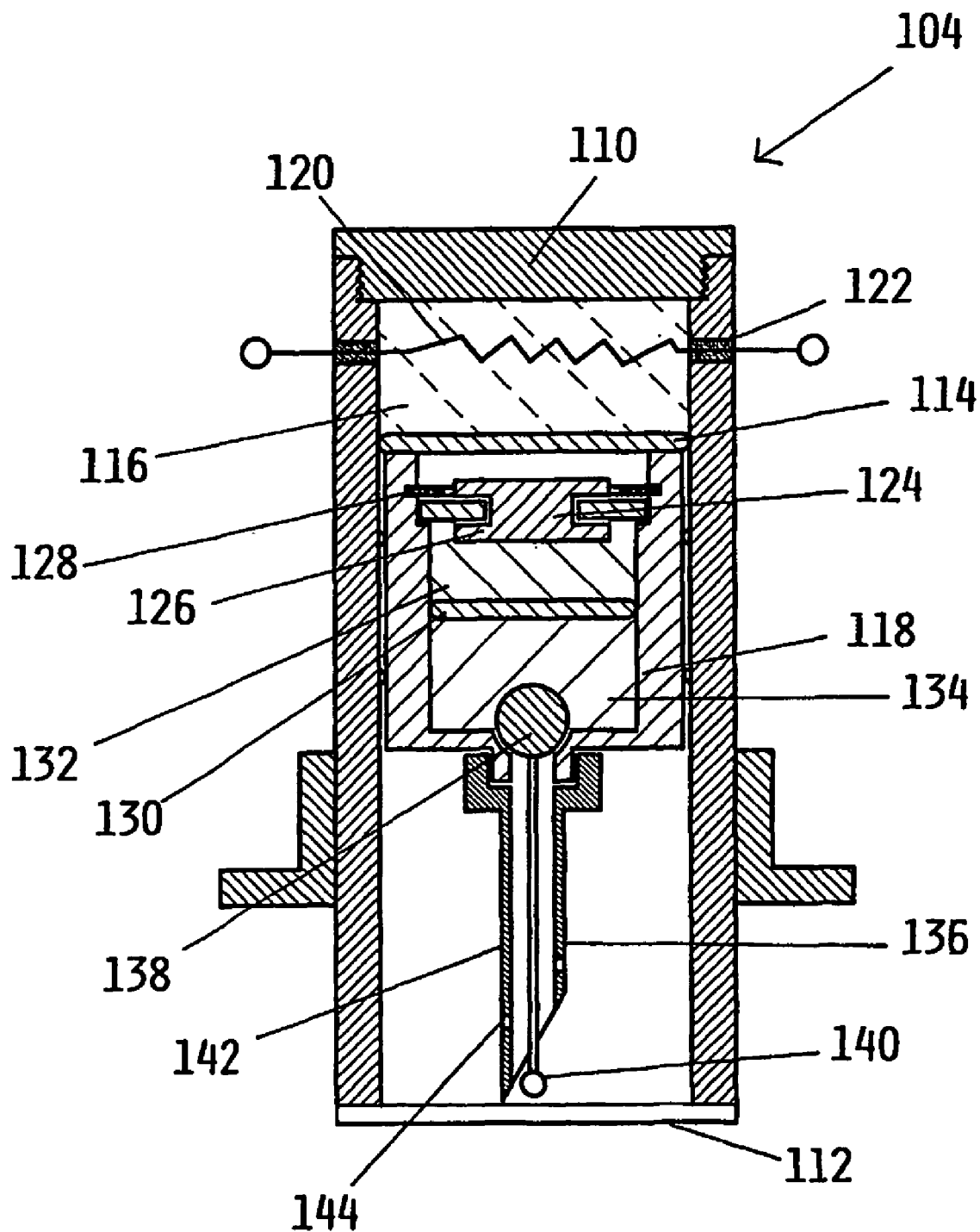
FIG. 15 shows an enlarged detail of the cylinder.

In the embodiment shown in FIGS. 10 and 11, the tag carries, on that wall facing the wrist, two metal plates 84 acting as discharge electrodes and two metal plates 86 acting as inductive sensors for sensing the presence of skin.

In the inner wall there are provided two longitudinal guide and slide slots 88 for corresponding plates 90. 92 positioned on the body of the button 42 and provided with a contact shoe for the metal plates 84 and 86.

The button head 44 houses metal inserts 94 in which a seat is provided for housing the electronic card 46, to thus effect the electrical contact with the metal plates by means of a conductor 98 embedded in the constituent material of the button and hence transfer the discharge from the card to the wrist.

In the same manner two further metal inserts 100 are housed within the button head to effect electrical contact with the metal plate 92 by means of a conductor 102 also embedded in the button and transfer the signal originating from the sensor 86.

In the embodiment shown in FIGS. 12–14 the tag is provided with inductive sensors as in the preceding example and also comprises a cylindrical metal container 104 mounted on the card, the tag base and the button being provided with two holes 106 and 108 respectively, which face substantially the container 104.

The metal container comprises a threaded upper plug 110 and an adhesive sealing film 112, and an internal disc 114 which separates a small ballistic charge 116 from a syringe 118.

The charge 116 is housed between the upper plug 110 and the disc 114 and can be triggered by a filament 120 which emerges at holes 122 provided in the cylinder.

The syringe has a body open at one end to house a closure plug 124 with perimetral gasket, a rubber recharging cap 126, a seal ring 128 for locking the plug and a divider disc 130 which separates a chamber 132 containing a pressurized gas from a chamber 134 containing a narcotizing liquid.

The chamber 134 extends in the form of a rod-type valving member 136 with a rubber sealing ball 138 and a rounded end 140 housed within a needle 142 provided with radial holes 144.

To use the tag of this embodiment, the triggering filament 120 is heated by the card 46 to explode the ballistic charge 116 which then causes expulsion of the syringe 118 from its seat within the metal container, to consequently drive the needle 42 into the skin of the person wearing the tag. Because of its shape the rod 136 of the valving member is not driven into the skin, but forms a discharge opening for the liquid urged by the pressurized gas, to enable the liquid to emerge from the radial holes.

In a further embodiment (not shown in the drawings) the button head is provided with an IR emitter connected to the card and activated by the control unit. Following the intrusion of a person into a prohibited area, the control unit activates the IR emitter which then activates the video camera (possibly provided with a collimated firing device) so that it follows the movement of the tag and hence of the person.

The invention claimed is:

1. An apparatus for monitoring persons within predetermined areas, comprising:
    a plurality of tags, applicable to persons and containing data characteristic of the persons, each tag comprising a box of parallelepiped shape from which one of the minor walls is lacking, and in which the two side walls are flat and the two major walls are slightly arched one of which presents two slots,
    at least one sensor for sensing the presence of each person, said at least one sensor being operationally connectable to each tag via an ether,
    a supervision and control unit operationally connected to said at least one sensor, in correspondence with the slot being provided two cylindrical seats housing the ends of a metal pin about which there is secured a strap carrying two metal conductors in its interior, wherein in proximity to the other slot, holes are provided in the two side walls of the box for the passage of knurled knobs for winding the strap.

2. An apparatus as claimed in claim 1, further comprising at least one monitor connected to said supervision and control unit and displaying the situation existing in the interior or said predetermined area.

3. An apparatus as claimed in claim 1, wherein the knobs engage with rotational constraint two threaded metal pins screwable axially into a winding roller for the strap.

4. An apparatus as claimed in claim 3, wherein the roller presents two holes into which the two terminations of the two metal conductors are inserted.

5. An apparatus as claimed in claim 3, wherein the roller is provided with toothed wheels.

6. An apparatus as claimed in claim 5, further comprising elastic fins opposing the free rotation of the assembly formed from the knurled knobs, the threaded pins, the roller and said toothed wheels.

7. An apparatus as claimed in claim wherein each tag comprises a removable portion engagable with the box.

8. An apparatus as claimed in claim 7, wherein the removable portion is in the shape of a button and contains in its interior an electronic care on which there are mounted a microprocessor with memory, a receiver, a transmitter, a battery and all the electronic components necessary for its operation.

9. An apparatus as claimed in claim 8, wherein to the edge of the card there are secured two motors guided along a corresponding hole formed in a metal seat provided on the base of the button.

10. An apparatus as claimed in claim 8, the button comprises two racks engagable in the toothed wheels.

11. An apparatus as claimed in claim 8, characterized by screwing into the button the head of an explosive or drug sensor provided with a plug connectable to a socket applied to the card.

12. An apparatus as claimed in claim 1, the tag carries, on that wall facing the wrist, two metal plates acting as discharge electrodes and two metal plates acting as inductive sensors for sensing the presence of skin, said discharge electrodes being connected to the card.

13. An apparatus as claimed in claim 8, wherein a syringe containing a narcotizing liquid is housed in the interior of the tag and can be activated by the card.

14. An apparatus as claimed in claim 13, wherein the syringe can be activated by exploding a ballistic charge.

15. An apparatus as claimed in claim 1, wherein an IR emitter is applied to the head of the sensor and is connected to the card.

16. An apparatus for monitoring persons within predetermined areas, comprising:
    a plurality of tags, applicable to persons them and containing data characteristic of the persons,
    at least one sensor for sensing the presence of each person, said at least one sensor being operationally connectable to each tag via the an ether,
    a supervision and control unit operationally connected to said at least one sensor,
    at least one monitor connected to said supervision and control unit and displaying the situation existing in the interior of said predetermined area, the monitor being mounted in the interior of an aircraft and comprising a sensor on the aircraft door.

* * * * *